United States Patent [19]
Skoff

[11] Patent Number: 6,102,791
[45] Date of Patent: Aug. 15, 2000

[54] COOLING-AIR OUTLET FOR A VEHICLE

[75] Inventor: Gerhard Skoff, Vienna, Austria

[73] Assignee: Steyr-Daimler-Puch Aktiengesellschaft, Vienna, Austria

[21] Appl. No.: 09/218,495

[22] Filed: Dec. 22, 1998

[30] Foreign Application Priority Data

Dec. 23, 1997 [AT] Austria ................................ 813/97 U

[51] Int. Cl.⁷ .................................................. B60H 1/26
[52] U.S. Cl. ............................................. 454/162; 89/1.1
[58] Field of Search .................................... 454/2, 76, 77, 454/79, 81, 84, 92, 103, 105, 115, 117, 141, 162, 164, 165; 60/271; 89/30, 1.1

[56] References Cited

U.S. PATENT DOCUMENTS

| | | |
|---|---|---|
| 3,279,193 | 10/1966 | Web ............................................ 89/1.1 |
| 3,817,030 | 6/1974 | Renius et al. ............................. 60/271 |
| 4,463,653 | 8/1984 | Pusch et al. . |
| 4,638,632 | 1/1987 | Wulf et al. . |
| 4,864,819 | 9/1989 | Steyer . |
| 4,926,921 | 5/1990 | Heinemann et al. . |

*Primary Examiner*—Harold Joyce
*Attorney, Agent, or Firm*—Bachman & LaPointe, P.C.

[57] ABSTRACT

The cooling-air outlet of a vehicle comprises a grill and a frame which encloses said grill and is provided on an outside wall of the vehicle. In order to render the grill, as far as possible, invisible in a thermal-imaging environment, the frame projects beyond the grill to the outside and comprises a hollow profile which forms a flow channel with an inlet opening and an outlet opening, a difference in pressure prevailing between inlet opening and outlet opening. This difference in pressure may be produced by an external or internal blower.

4 Claims, 2 Drawing Sheets

COOLING-AIR OUTLET FOR A VEHICLE

BACKGROUND OF THE INVENTION

The present invention is drawn to a cooling-air outlet for a vehicle, comprising a grill and a frame which encloses said grill and is provided on an outside wall of the vehicle. Said vehicle may be constituted, in particular, by military vehicles and other vehicles which come under fire. It is therefore also the case that the grill is usually a ballistic grill.

A cooling-air outlet of this type is known, for example, from U.S. Pat. No. 4,926,921. In armored vehicles, such an outlet is arranged on the tail, on the top side of the hull or on the side, but preferably on the top side. In non-armored vehicles, it is usually arranged on the front. The cooling air flowing out through it heats up the grill to a temperature of 100° C. and above.

Modern battleground reconnaissance and target acquisition is carried out predominantly with the aid of very sensitive thermal-imaging equipment which supplies black and white video images. This equipment reacts to differences in surface temperature of solid bodies. In other words, the warmer a surface, the lighter it appears on the video image. This enables such so-called hot spots to be detected even at large distances. A grill heated to 100° C. constitutes such a hot spot.

It is the principle object of the invention to provide a grill vent which is, as far as possible, invisible, and thus as difficult to locate as possible, in a thermal-imaging environment.

SUMMARY OF THE INVENTION

The foregoing object is achieved wherein a frame projects beyond the grill to the outside ambient environment and comprises a hollow profile which forms a flow channel with an inlet opening and an outlet opening, a difference in pressure prevailing between inlet opening and outlet opening.

The invention resides in the fact that the hot gases remain invisible on the thermal image. The projecting frame ensures that the grill itself remains invisible from the side over a wide range. In order to prevent this screen from heating up slowly, it is designed as a flow channel which, for its part, has a cooling medium flowing through it. This throughflow is produced by the difference in pressure.

The difference in pressure can be produced in a variety of different ways. Either the inlet opening or outlet opening is connected to a pressure or negative-pressure source in the vehicle (an interior ventilator or an engine-cooling blower) or the inlet opening or outlet opening is connected to a dedicated blower. The difference in pressure could also be produced merely by the relative wind.

BRIEF DESCRIPTION OF THE DRAWINGS

The invention is described hereinbelow with reference to drawings, in which.

DETAILED DESCRIPTION

Figure 1:
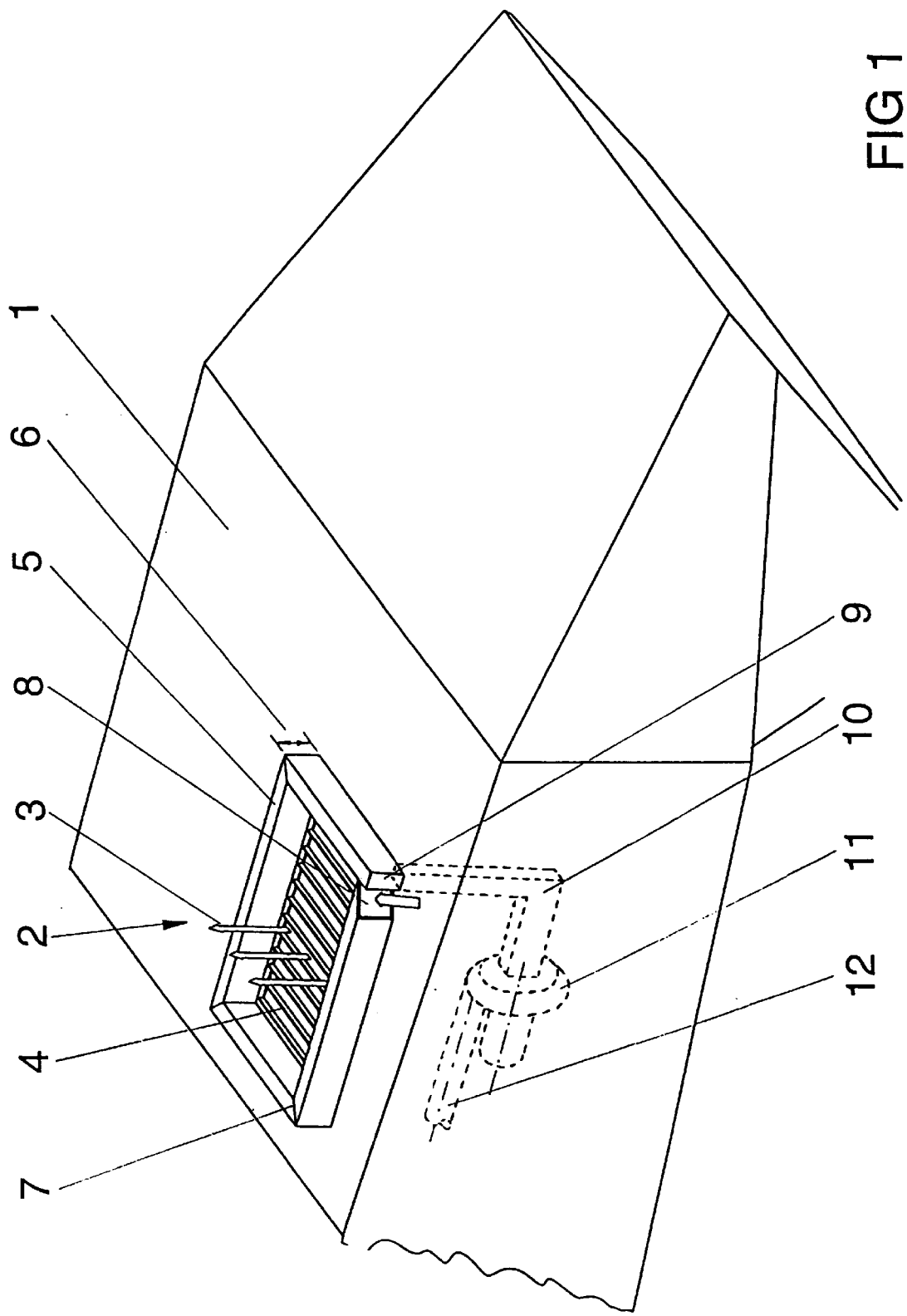
FIG. 1 shows a view of part of a combat vehicle with a cooling-air inlet according to the invention in a first embodiment.

In FIG. 1, the hull of the vehicle is merely indicated and its more or less horizontal roof panel is designated by 1. Located in the latter is a cooling-air vent outlet 2 which has cooling air 3, heated to 100° C. by the radiator of the engine, flowing out of it. The cooling-air outlet 2 is formed by a grill 4 and a frame 5 which encloses said grill. The grill 4 is a ballistic grill formed by very strong bars. The frame 5 is formed by four hollow profiles which adjoin one another with miter joints 7 and are either positioned on the roof panel 1 from the outside or introduced so as to project inward. The hollow profile, which forms the frame 5, is spaced apart from the bars of the grill 4 by a certain height 6. This height serves as a screen and has the effect of causing the grill 4 itself to be invisible from the side.

Figure 2:
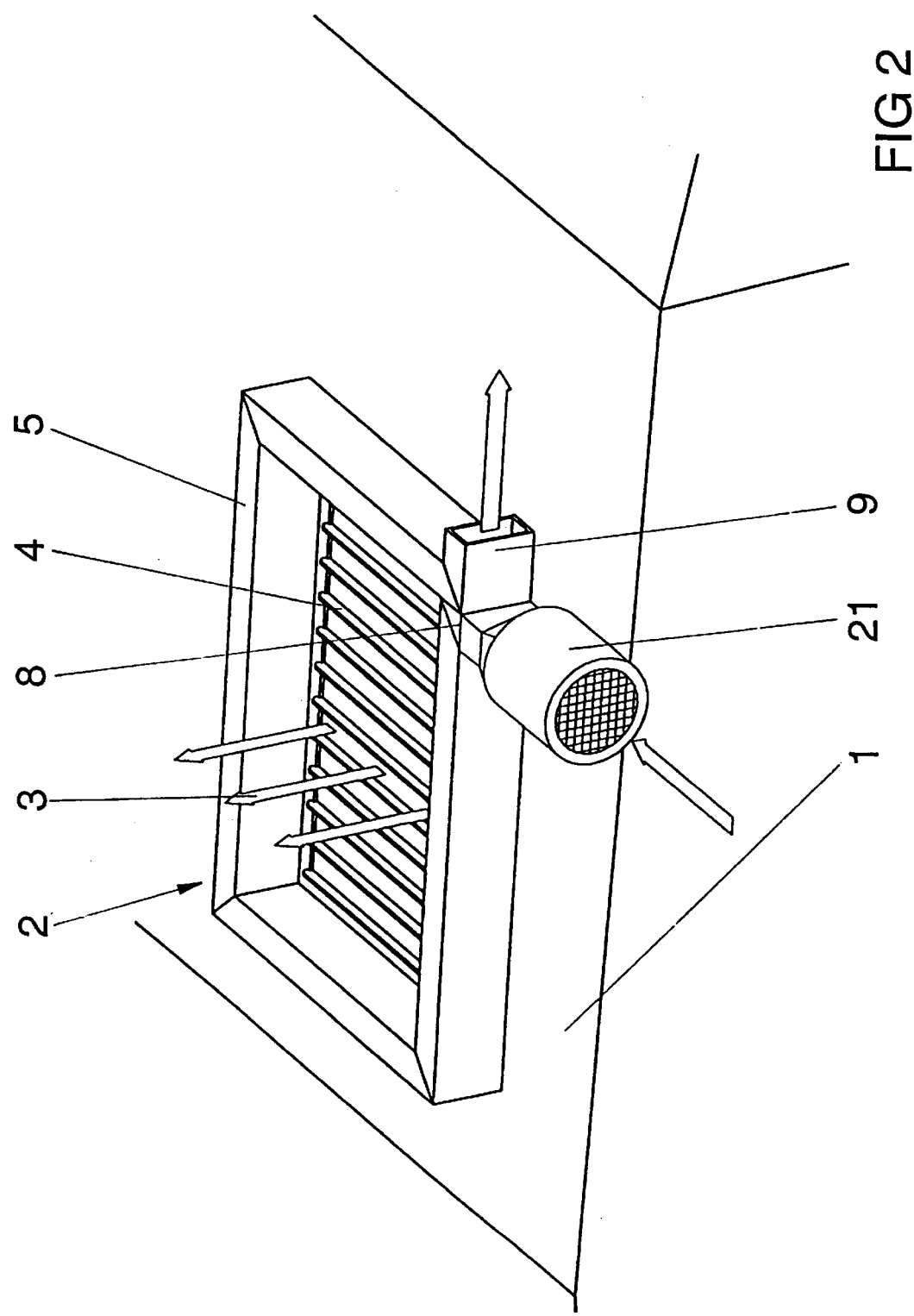
FIG. 2 shows, on a larger scale, the same vehicle in a second embodiment.

The four sides of the frame 5 form a flow channel with an inlet 8 (where the profile is cut away obliquely) and an outlet 9. In the exemplary embodiment shown, this outlet 9 is connected, via a channel 10 located in the interior of the hull, to an induced-draft blower 11 which, by way of a channel 12, supplies fresh air into the interior of the vehicle. The embodiment of FIG. 2 differs from this in that an external blower 21 is connected to the inlet of the frame 5 and the outlet 9 leads into the open air.

Air which is blown through the four sides of the frame 5 in one way or the other cools said frame, with the result that it cannot be heated by the outgoing cooling air. This means that the frame remains at a temperature close to the ambient temperature and, as seen from the side, cannot be detected on a thermal image of the vehicle.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. An air vent for a vehicle, comprising:

a vehicle having an outside wall for separating the interior of the vehicle from ambient, the outside wall having an opening for communicating the interior of the vehicle with ambient; a grill mounted in the opening; frame means surrounding the grill for extending the opening, the frame means comprises a hollow profile forming a flow channel and having an inlet to the flow channel and an outlet from the flow channel; and means for creating a pressure differential between the inlet and the outlet.

2. An air vent according to claim 1 wherein one of the inlet and outlet is connected to a pressure source in the vehicle.

3. An air vent according to claim 1 wherein one of the inlet and outlet is connected to a negative-pressure source in the vehicle.

4. An air vent according to claim 1 wherein one of the inlet and outlet is connected to an external blower.

* * * * *